US010917290B2

(12) United States Patent
Bedekar

(10) Patent No.: US 10,917,290 B2
(45) Date of Patent: Feb. 9, 2021

(54) INTERFACE FOR A CLOUD RADIO ACCESS NETWORK

(71) Applicant: NOKIA TECHNOLOGIES OY, Espoo (FI)

(72) Inventor: Anand Bedekar, Glenview, IL (US)

(73) Assignee: NOKIA TECHNOLOGIES OY, Espoo (FI)

(*) Notice: Subject to any disclaimer, the term of this patent is extended or adjusted under 35 U.S.C. 154(b) by 197 days.

(21) Appl. No.: 15/439,384

(22) Filed: Feb. 22, 2017

(65) Prior Publication Data

US 2018/0241619 A1 Aug. 23, 2018

(51) Int. Cl.

| | |
|---|---|
| ***G06F 15/16*** | (2006.01) |
| ***H04L 12/24*** | (2006.01) |
| ***H04L 12/927*** | (2013.01) |
| ***H04W 76/10*** | (2018.01) |
| *H04W 92/14* | (2009.01) |

(52) U.S. Cl.

CPC .......... *H04L 41/0803* (2013.01); *H04L 47/80* (2013.01); *H04W 76/10* (2018.02); *H04W 92/14* (2013.01)

(58) Field of Classification Search

CPC .................................................... H04W 76/15

USPC ......................................................... 709/220

See application file for complete search history.

(56) References Cited

U.S. PATENT DOCUMENTS

2009/0046599 A1* 2/2009 Pollakowski ....... H04L 41/0806 370/254

2009/0252132 A1* 10/2009 Song .................... H04W 76/15 370/338

2013/0178210 A1* 7/2013 Wang ............... H04W 36/0011 455/436

(Continued)

FOREIGN PATENT DOCUMENTS

EP 2 512 202 A1 10/2012

OTHER PUBLICATIONS

3GPP TS 36.413 V14.0.0 (Sep. 2016) Technical Specification Group Radio Access Network, Evolved Universal Terrestrial Radio Access Network (E-UTRAN), S1 Application Protocol (S1AP) (Release 14), 2016.

(Continued)

*Primary Examiner* — Hamza N Algibhah

(74) *Attorney, Agent, or Firm* — Squire Patton Boggs (US) LLP

(57) ABSTRACT

Various communication systems may benefit from improved communications for a cloud radio access network. For example, certain communication systems may benefit from an improved S1 interface that connects a network entity to front ends in a cloud radio access network. A method, in certain embodiments, may include receiving at least one setup message at a network entity from a plurality of front ends. Multiple connections may be established between the network entity and the plurality of front ends. The method may also include choosing at least one of the multiple connections to transmit another message to one of the (Continued)

plurality of front ends which map back to a common set of at least one radio access points, network nodes, or cells, and transmitting the another message through the chosen one of the multiple connections to the common set of at least one radio access points, network nodes, or cells.

14 Claims, 9 Drawing Sheets

(56) References Cited

U.S. PATENT DOCUMENTS

2014/0219248 A1* 8/2014 Reddiboyana ........ H04W 76/15 370/331
2015/0312841 A1* 10/2015 Sirotkin ............. H04W 40/246 370/254
2015/0334042 A1 11/2015 Katayama et al.
2016/0119037 A1* 4/2016 Won .................... H04B 7/0619 370/328
2016/0262069 A1* 9/2016 Parsay ................ H04W 36/165
2016/0330748 A1* 11/2016 Bindrim ............. H04L 65/1013
2017/0265133 A1* 9/2017 Chandramouli .. H04W 52/0241
2018/0352593 A1* 12/2018 Velev ................... H04W 76/12

OTHER PUBLICATIONS

Liang Liu et al, “Analysis of Handover Performance Improvement in Cloud-RAN Architecture”; 2012; pp. 850-855.
Intel S2-161056 (Revision of S2-16xxxx), Solution to Key on Minimising Access Dependencies; 2016, pp. 1-6.
International Search Report and Written Opinion, International Application No. PCT/EP2018/052878, dated Apr. 24, 2018.
International Preliminary Report corresponding to Int’l Patent Appln. No. PCT/IB2017/001190, dated Aug. 27, 2019.
Communication pursuant to Article 94(3) EPC dated Oct. 28, 2020 corresponding to European Patent Application No. 18705345.9.

* cited by examiner

INTERFACE FOR A CLOUD RADIO ACCESS NETWORK

BACKGROUND

Field

Various communication systems may benefit from improved communications for a cloud radio access network. For example, certain communication systems may benefit from an improved S1 interface that connects a network entity to front ends in a cloud radio access network.

Description of the Related Art

In Third Generation Partnership Project (3GPP) technology, such as Long Term Evolution (LTE) or LTE Advanced (LTE-A), the core network architecture, known was a System Architecture Evolution (SAE) includes an S1 interface. S1 is a unique connection between one evolved NodeB (eNB) and one mobility management entity (MME). A global eNB identifier (ID) is used to map the eNB to the MME as a one-to-one S1 connection. In doing so, the eNB provides the global eNB ID to the MME, as well as a list of Tracking Area Codes (TACs) that the eNB supports, during S1-setup. MME may subsequently use the global eNB ID to identify the S1 connection that it needs to use when initiating a user equipment (UE) associated procedure. For example, the UE associated procedure may be paging or a handover request.

In LTE, the global eNB ID (20-bits) is an over-the-air construct that allows for distribution of information from a central location to all users included in a given communication system. The global eNB ID occupies the first 20 of the 28-bit Evolved Universal Mobile Telecommunications System (UMTS) Terrestrial Radio Access Network (EUTRAN) Cell Global Identity (ECGI) broadcast as part of the system information (SIB1). The over-the-air Global eNB ID is also reused as an identifier of the S1 connection.

With the introduction of cloud based technology in $5^{th}$ generation (5G) technology, however, the one-to-one nature of the LTE S1 interface is less than ideal. In LTE, the eNB refers to a physical box that hosted a certain number of cells, and mapped to a single S1 connection to the MME. In a cloud radio access network (RAN), the eNB is merely a logical collection of cells which are not necessarily hosted in a single physical box, but rather are assigned to be processed by a virtual machine (VM) for load-balancing purposes. The nature of the LTE S1 interface may therefore act to constrain the cloud RAN flexibility, as well as impair pooling, load-balancing, and scalability of the cloud RAN.

SUMMARY

According to certain embodiments, an apparatus may include at least one memory including computer program code, and at least one processor. The at least one memory and the computer program code may be configured, with the at least one processor, to cause the apparatus at least to receive at least one setup message at a network entity from a plurality of front ends. Multiple connections may be established between the network entity and the plurality of front ends. The at least one memory and the computer program code may also be configured, with the at least one processor, to cause the apparatus at least to choose at least one of the multiple connections to transmit another message to one of the plurality of front ends which map back to a common set of at least one radio access points, network nodes, or cells. In addition, the at least one memory and the computer program code may be configured, with the at least one processor, to cause the apparatus at least to transmit the another message from the network entity through the chosen one of the multiple connections to the common set of at least one radio access points, network nodes, or cells.

A method, in certain embodiments, may include receiving at least one setup message at a network entity from a plurality of front ends. Multiple connections may be established between the network entity and the plurality of front ends. The method may also include choosing at least one of the multiple connections to transmit another message to one of the plurality of front ends which map back to a common set of at least one radio access points, network nodes, or cells. In addition, the method may include transmitting the another message from the network entity through the chosen one of the multiple connections to the common set of at least one radio access points, network nodes, or cells.

An apparatus, in certain embodiments, may include means for receiving at least one setup message at a network entity from a plurality of front ends. Multiple connections may be established between the network entity and the plurality of front ends. The apparatus may also include means for choosing at least one of the multiple connections to transmit another message to one of the plurality of front ends which map back to a common set of at least one radio access points, network nodes, or cells. In addition, the method may include means for transmitting the another message from the network entity through the chosen one of the multiple connections to the common set of at least one radio access points, network nodes, or cells.

According to certain embodiments, a non-transitory computer-readable medium encoding instructions that, when executed in hardware, perform a process. The process may include receiving at least one setup message at a network entity from a plurality of front ends. Multiple connections may be established between the network entity and the plurality of front ends. The process may also include choosing at least one of the multiple connections to transmit another message to one of the plurality of front ends which map back to a common set of at least one radio access points, network nodes, or cells. In addition, the process may include transmitting the another message from the network entity through the chosen one of the multiple connections to the common set of at least one radio access points, network nodes, or cells.

According to certain other embodiments, a computer program product may encode instructions for performing a process. The process may include receiving at least one setup message at a network entity from a plurality of front ends. Multiple connections may be established between the network entity and the plurality of front ends. The process may also include choosing at least one of the multiple connections to transmit another message to one of the plurality of front ends which map back to a common set of at least one radio access points, network nodes, or cells. In addition, the process may include transmitting the another message from the network entity through the chosen one of the multiple connections to the common set of at least one radio access points, network nodes, or cells.

According to certain embodiments, an apparatus may include at least one memory including computer program code, and at least one processor. The at least one memory and the computer program code may be configured, with the at least one processor, to cause the apparatus at least to receive message in at least one radio access points, network nodes, or cells through at least one of multiple connections from a network entity. The at least one radio access points, network nodes, or cells may be part of a common set that are mapped back from a plurality of front ends. The multiple connections may be established between the network entity and the plurality of front ends.

A method, in certain embodiments, may include receiving message in at least one radio access points, network nodes, or cells through at least one of multiple connections from a network entity. The at least one radio access points, network nodes, or cells may be part of a common set that are mapped back from a plurality of front ends. The multiple connections may be established between the network entity and the plurality of front ends.

An apparatus, in certain embodiments, may include means for receiving message in at least one radio access points, network nodes, or cells through at least one of multiple connections from a network entity. The at least one radio access points, network nodes, or cells may be part of a common set that are mapped back from a plurality of front ends. The multiple connections may be established between the network entity and the plurality of front ends.

According to certain embodiments, a non-transitory computer-readable medium encoding instructions that, when executed in hardware, perform a process. The process may include receiving message in at least one radio access points, network nodes, or cells through at least one of multiple connections from a network entity. The at least one radio access points, network nodes, or cells may be part of a common set that are mapped back from a plurality of front ends. The multiple connections may be established between the network entity and the plurality of front ends.

According to certain other embodiments, a computer program product may encode instructions for performing a process. The process may include receiving message in at least one radio access points, network nodes, or cells through at least one of multiple connections from a network entity. The at least one radio access points, network nodes, or cells may be part of a common set that are mapped back from a plurality of front ends. The multiple connections may be established between the network entity and the plurality of front ends.

BRIEF DESCRIPTION OF THE DRAWINGS

For proper understanding of the invention, reference should be made to the accompanying drawings, wherein.

DETAILED DESCRIPTION

Certain embodiments provide for an enhanced S1 interface that can overcome the limitations of an LTE S1 interface, and maximize the benefits of the S1 interface for a cloud RAN in a 5G or a next generation (NG) network. The S1 interface may also be referred to as either a NG connection (NG-C) or an NG2. In certain embodiments, for any given cell, which is part of a particular TAC, the MME may have a plurality of S1 connections to multiple front ends in a cloud RAN, which map back to a common set of radio access points, network nodes, such as eNBs, or cells.

Figure 1:
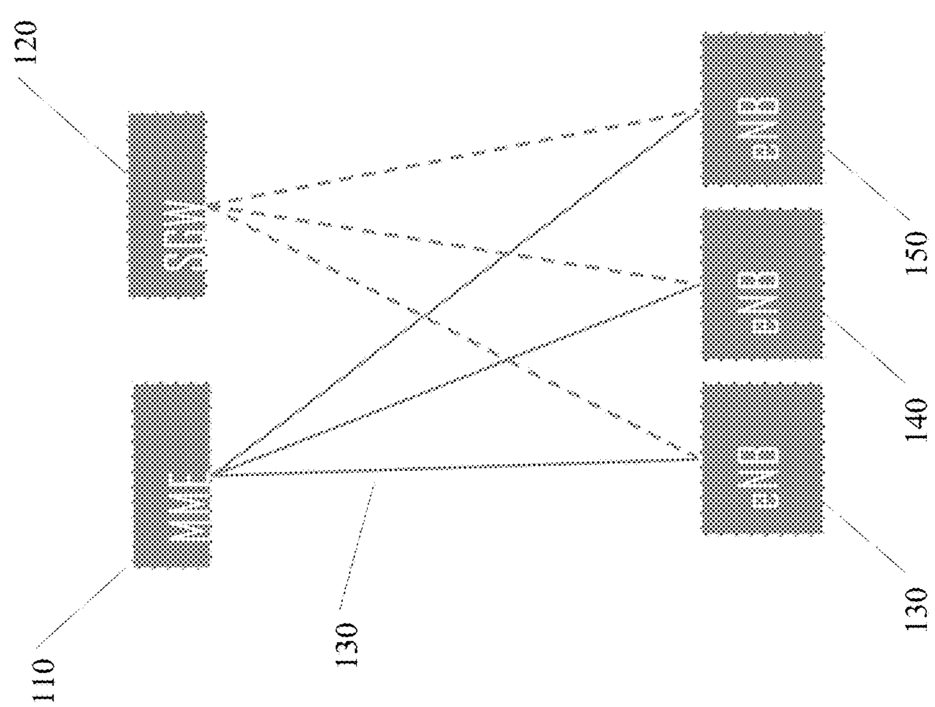
FIG. 1 illustrates an LTE S1 interface.

In LTE, the S1 is a unique connection between one eNB and one MME. As described in 3GPP TS 36.413, the global eNB ID maps to a one-to-one S1 connection. 3GPP TS 36.413 is hereby incorporated in its entirety. FIG. 1 illustrates an LTE S1 interface. As can be seen in FIG. 1, each S1 interface 130 connects MME 110 with only a single eNB of the three eNBs 130, 140, and 150 shown in FIG. 1. Similar one-to-one connections are also shown between SGW 120 and eNBs 130, 140, and 150.

In a cloud RAN, the S1-MME, as well as other control plane functions, may process a large number of cells that are hosted in a given cloud RAN. It, therefore, may be beneficial to distribute the processing of the large number of cells hosted in a given cloud RAN. Certain embodiments allow for the distributing of the processing of the cells hosted in a cloud RAN across a pool of virtual machines. This distribution can provide for improved load-balancing, maximize pooling gains, and increase resiliency of the network in case of failures. To achieve these benefits, the traditional one-to-one relationship involved in the LTE S1 interface may be changed. In addition, since the first 20 of 28 bits of ECGI represent the global eNB ID, this limits the number of cells that can be mapped to a given S1 connection. For example, a maximum of 256 cells may be allowed.

Figure 2:
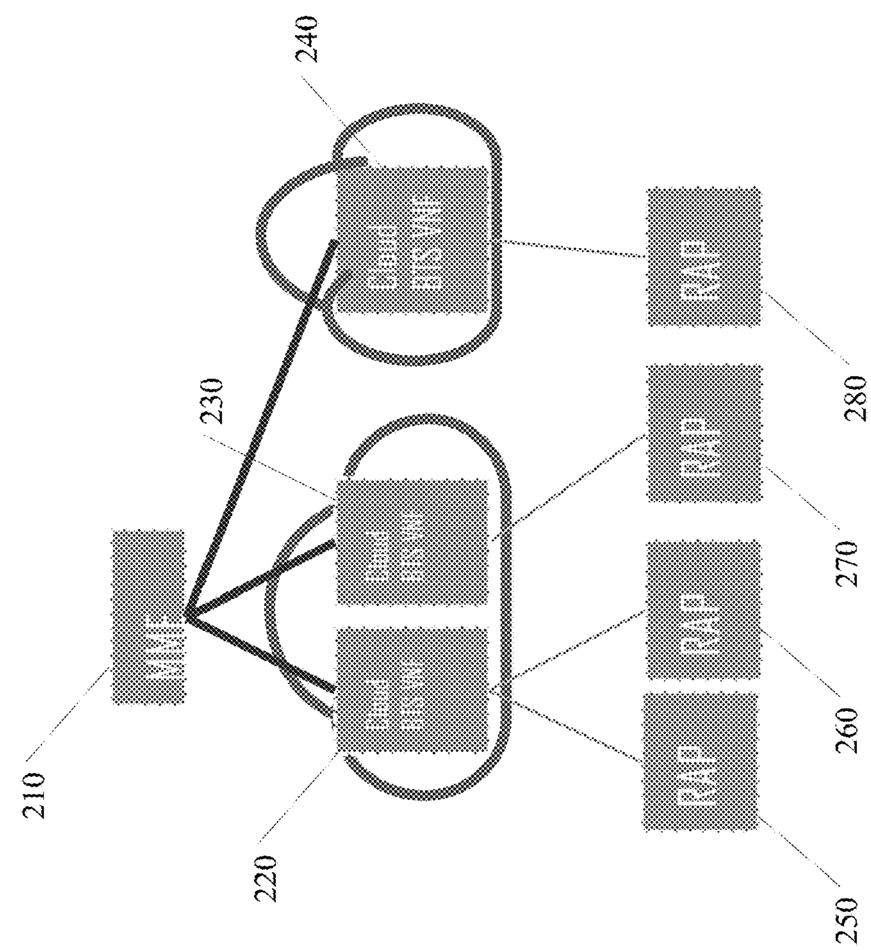
FIG. 2 illustrates an S1 interface using LTE rules in a cloud based system environment.

FIG. 2 illustrates an S1 interface using LTE rules in a cloud based system environment. In other words, FIG. 2 illustrates the effects of using an LTE S1 interface with a cloud RAN. MME 210 has a single S1 connection to each of the cloud based base transceiver station (BTS) virtual network function (VNF) 220, 230, and 240. A single connection is then established between the four radio access points (RAP) 250, 260, 270, and 280, and the available BTS VNF. For example, BTS VNF 240, which is located in a separate cloud RAN from the other BTS VNFs only has a connection with RAP 280. Because of the one-to-one characteristic of an LTE S1, the RAP 280 may only have a connection with BTS VNF 240, and may not connect to BTS VNF 220 or BTS VNF 230. As shown in the embodiment of FIG. 2, the characteristics of the LTE S1 interface or connection act to constrain the cloud RAN flexibility, as well as impair pooling, load-balancing, and scalability of the network.

Certain embodiments therefore allow for a network entity, such as a network management entity, for example a MME, to have multiple S1 connections to a plurality of front ends, which may be located in the cloud RAN. The front ends may map back to a common set of RAPs, network nodes, and/or cells. While certain embodiments below are described in the context of, or using similar terminology as, an LTE S1 interface, the embodiments may apply to 5G or any other next generation technology.

Figure 3:
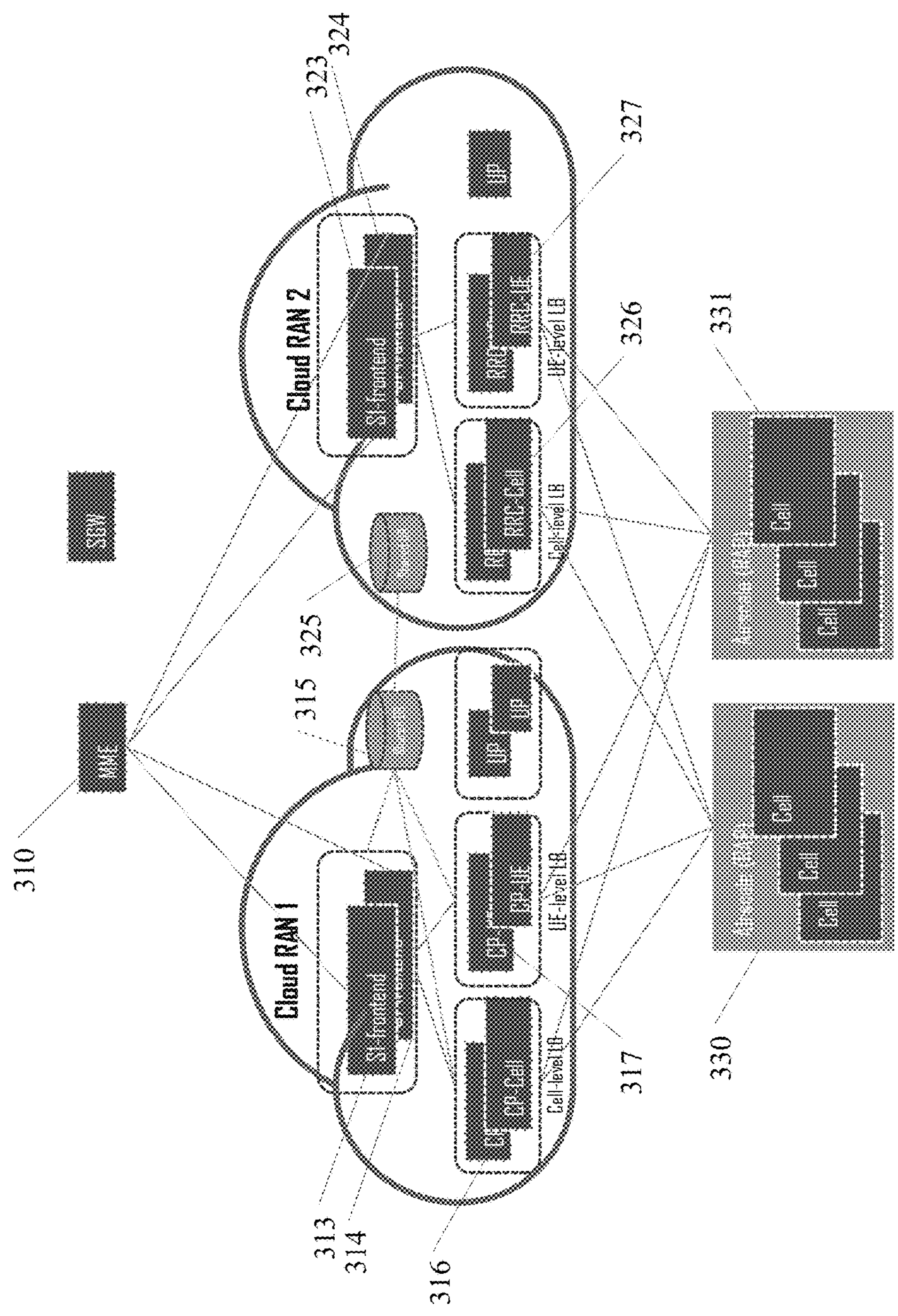
FIG. 3 illustrates a system according to certain embodiments.

FIG. 3 illustrates a system according to certain embodiments. In particular, FIG. 3 illustrates an improved S1 interface in a cloud based system that includes a cloud RAN. Two cloud RAN, cloud RAN 1 and cloud RAN 2 are provided in the system shown in FIG. 3. Each cloud RAN may have a plurality of S1 front ends 313, 314, 323, and 324, simply referred to as front ends, which can handle S1 traffic for any cell or RAP. Two RAPs 330 and 340 are shown in FIG. 3. The front ends may be located in at least one VM or container. In some embodiments, the S1 connection in certain embodiments may be located between MME 310 and the front ends 313, 314, 323, and 324 in the cloud RAN. The front ends may be in the same cloud data center, such as front ends 313 and 314, or may be geographically dispersed, such as front ends 313 and 323. The cloud RANs may each include at least one shared database 315, 325. In other embodiments, at least one shared database may be utilized by a plurality of cloud RAN.

In certain embodiments, each front end may have knowledge of which RAPs or eNB identifiers the front end is allowed to serve. The front end may be configured with such knowledge, may receive a list of allowable RAPs or eNB IDs from an operations and maintenance entity (O&M), or any other network entity, and/or may be informed of, or make load balancing decisions, which dictate which RAPs the front ends are allowed to serve. The list may be included as part of an S1 setup request received by the MME. In addition, in some embodiments, the front ends may have knowledge of the TACs mapped to those RAPs. Any given RAP may be mapped to multiple front ends, which may be located in one or more different data centers. In certain embodiments, any front end may be allowed to serve any RAP, cell, or eNB.

When the front end included in the cloud RAN establishes a front end instance, the front ends may provide the network entity, such as an MME, with at least one list of identifiers corresponding to the RAPs or cells that the front ends are expected to serve. A front end instance may include an S1 or NG-C connection between a given front end in a cloud RAN and an MME. In another embodiment, the identifiers may be provided in any form other than a list. The identifiers may be directed to at least one of cells, RAPs, or network nodes, such as eNBs. In addition to the list of identifiers, a list of TACs corresponding to those cells, RAPs, or network nodes, may also be included.

As shown in FIG. 3, in certain embodiments front ends 313, 314, 323, 324, may utilize control plane (CP) functions that relate to cells 316, 326, or CP functions that relate to UEs 317, 327. The control plane functions may be included within the cloud RAN, and may act as intermediaries between the front ends and the RAPs during processing of a command sent from the MME to a RAP.

In certain embodiments, the at least one list of identifiers received by the network entity, such as an MME, may be a list of network node identifiers, such as eNB identifiers. A RAP may broadcast an over-the-air message including an ECGI, which may include an eNB identifier. For example, in some identifiers, the first 20 bits of the ECGI may comprise the eNB identifier or eNB ID and the remaining bits may comprise a cell identity. Different cells of a RAP may have a common eNB identifier and differ only in the cell identity. This eNB identifier in some embodiments may be different at each RAP. The list of identifiers may include a list of such eNB identifiers, which may be associated with RAPs. The list of identifiers may be described using wild card characters, to avoid having to explicitly provide a large number of network node IDs. A wild card character may be a single character, such as an asterisk, that may be used to represent one or more identifiers. In other embodiments, a list of identifiers may not be provided. Rather, the front end may serve any RAP, cell, or network node.

In some embodiments, the MME may receive an indication that the front ends are prepared to accept S1 traffic for all S1 procedures, only UE associated procedures, or only non-UE associated procedures. A non-UE-associated procedure for example, may include a reset procedure or an Overload Start or Overload Stop procedure, which may not associated with a particular UE but with some other entity such as the S1 connection, or with a cell or an eNB. A UE associated procedure, for example, may be paging or a handover request. The indication may be received by the MME as part of an S1 setup request message. In other embodiments, the indication may be included as part of the list of cells, network nodes, or RAPs.

In certain embodiments, the same cell, access point, or network node may be represented by more than one frontend. For example, the at least one list of identifiers received from a first front end may have at least one identifier in common with the at least one list of identifiers received from a second front end.

As can be seen in FIG. 3, from the perspective of MME 310, for any given RAP, network node, or cell, the MME may have multiple connections to a plurality front ends. The plurality of front ends may map back to a common set of at least radio access points, network nodes, or cells. Some front ends may handle only UE associated or only non-UE associated signaling for a given cell, RAP, or network node. A network entity, such an MME, may choose one of the multiple connections, and transmit a message from the network entity through the chosen one of the multiple connections to the common set of at least one radio access points, network nodes, or cells.

In a further embodiment, the list of identifiers may be a list of cell identifiers, such as ECGIs. The cell identifiers may or may not belong to a common RAP. In other words, the cell identifiers may all belong to a common RAP, such as RAP 330, or may belong to one or more RAPS, such as RAP 330 and RAP 331. As shown in FIG. 3, for any given RAP, network node, or cell, the MME may have multiple S1 connections to multiple front ends. Some front ends may optionally have announced or declared that they can handle only UE associated signaling for that cell or network node. The announcing or declaring by the front ends may merely involve sending an indication to the MME, which may be included as part of the list of identifiers sent to the MME. When the MME initiates certain signaling S1 procedure, related to a given UE, the MME may choose which S1 connection to use for that procedure.

Figure 4:
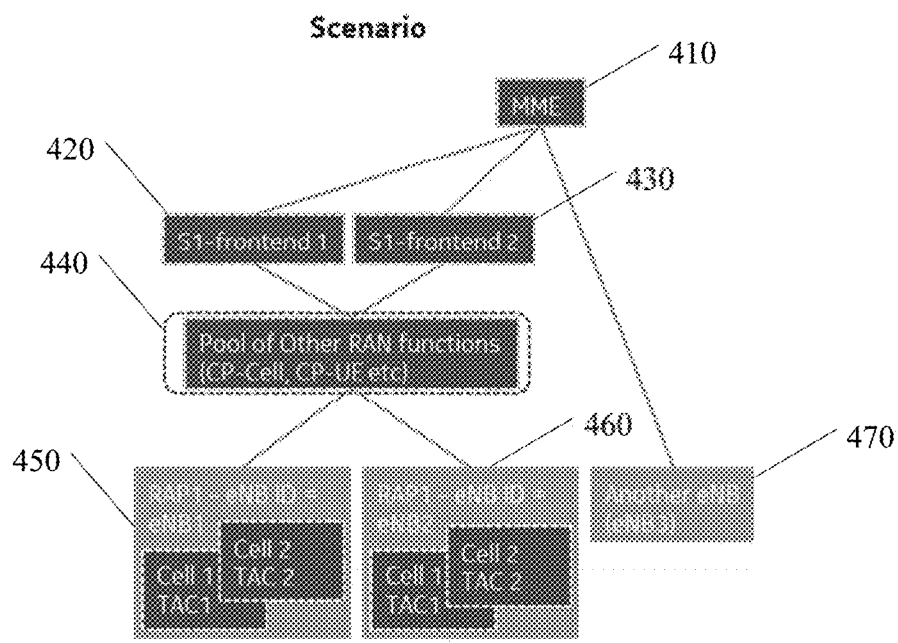
FIG. 4 illustrates a system according to certain embodiments.

FIG. 4 illustrates a system according to certain embodiment. In particular, FIG. 4 illustrates an MME 410, a first front end 420, a second front end 430, and a pool of other RAN functions 440. RAP 450, which includes two cells and a network node, RAP 460, which similarly includes two cells and a network node, and network node 470, having an eNB ID of eNB3, are also provided. The eNB ID of RAP 450 is eNB1, while the eNB ID of RAP 460 is eNB2. From the perspective of RAP 450 and RAP 460, as well as from the perspective of eNB1 and eNB2, MME 410 may have a plurality of S1 connections to multiple front ends.

Figure 5:
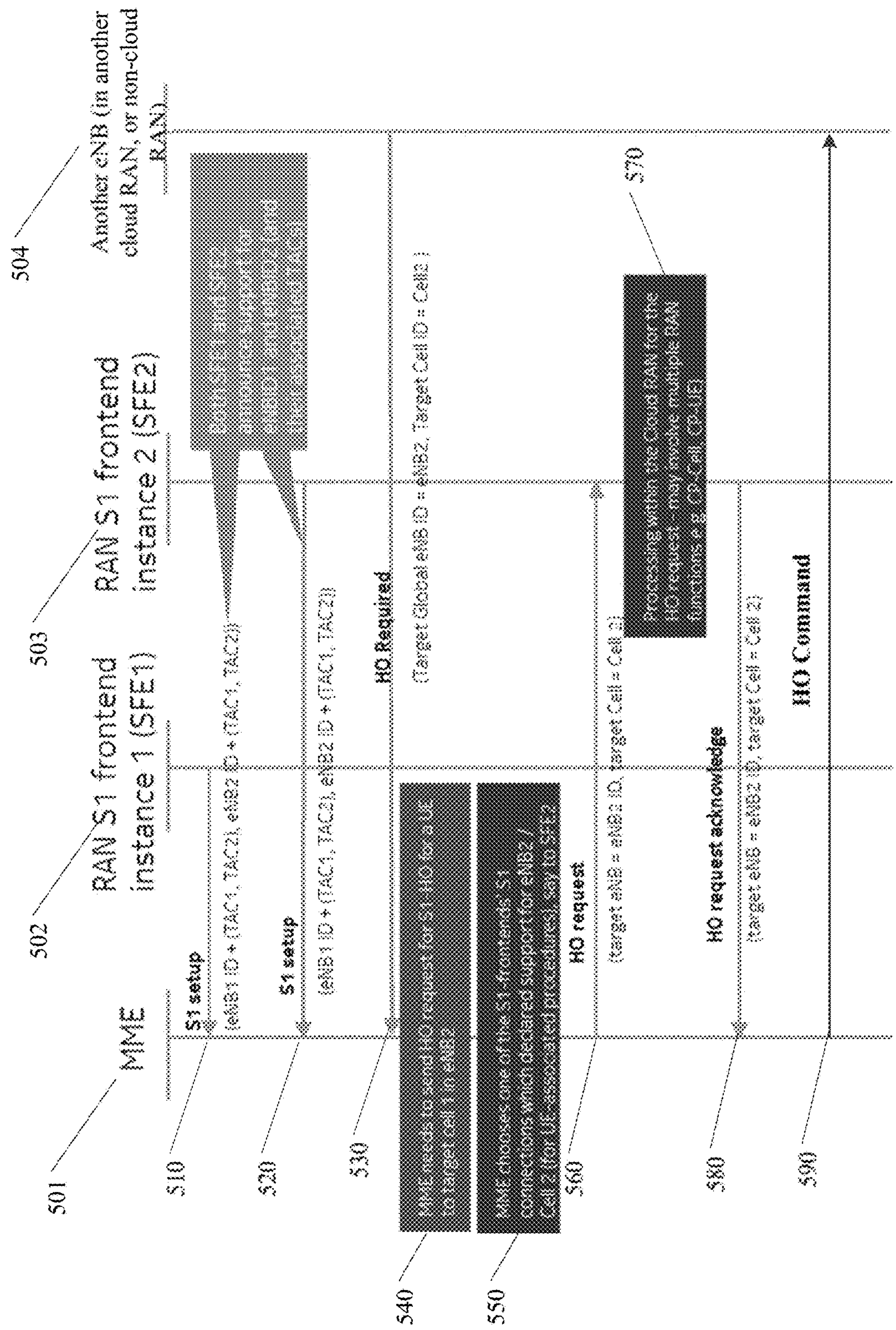
FIG. 5 illustrates a signal flow diagram according to certain embodiments.

FIG. 5 illustrates a signal flow diagram according to certain embodiments. In particular, FIG. 5 illustrates an example of a handover performed in a system as described in FIG. 4. In FIG. 5, MME 501 may receive an S1 setup message in step 510 from RAN S1 front end instance 1

(SFE1) 502. The S1 setup message may include an eNB1 ID, an eNB2 ID, as well as TAC1 and TAC2. In addition, in step 520, MME 501 may receive an S1 setup from RAN S1 front end instance (SFE2) 503. The S1 setup message received in step 510 and/or step 520 may include an eNB1 ID, an eNB2 ID, as well as TAC1 and TAC2. In other words, both SFE1 and SFE2 announce or declare support for eNB1 and eNB2, as well as their associated TACs.

In some embodiments, when the source eNB may also be a cloud RAN, as shown in FIG. 5, multiple front end instances may be capable of initiating handovers for a given source eNB. For different handovers originating in the same source cell or network node, the MME may receive the handover (HO) required message from different front ends. The HO required message may indicate to the network entity that a HO of a given UE may be needed. HO may be considered a UE associated procedure. For example, in FIG. 5 the UE may be handed over from eNB2 to the another eNB.

In step 530, MME 501 receives a HO required message, from another eNB, in another cloud RAN or non-cloud RAN. For example, the another eNB may be eNB 470 in FIG. 4. The HO required message may include a target global eNB ID and target cell ID. In step 540, based on the received HO message, MME 501 can send an HO request for a UE to a target cell in eNB 2. MME 501 may then choose a suitable S1 connection from the multiple S1 connections which have declared or announced the eNB ID or cell ID of interest, for example those connections providing support for eNB2.

In certain embodiments, MME 501 may choose the S1 connection based on a round-robin scheduling approach. In a round-robin approach, each S1 connection may be used once, and the use of the S1 connection may be repeated in a circular order. In another embodiment, MME 501 may choose the S1 connection based on a load-balancing fashion. For example, the load balancing may be based on a count of the messages that were recently sent on that connection, or a load value announced by the S1 peer.

In certain embodiments, the HO request may be sent through the S1 connection chosen by MME 501, which has declared support for the target eNB ID. For example, MME 501 sends the HO request to RAN SFE2, as shown in step 560. The target eNB may be determined by the HO required message received by MME 501 in step 530. In step 570, RAN SFE2 may process within the cloud RAN the HO request. In some embodiments, the processing of the HO request may involve forwarding the request to multiple RAN functions, such as the pool of RAN functions 440. In step 580, the HO request acknowledgement is sent back from RAN SFE2 503 to MME 501. MME 501 may then send the HO command to the another eNB 504, and the UE may be handed over from eNB 2 to the another eNB.

Figure 6:
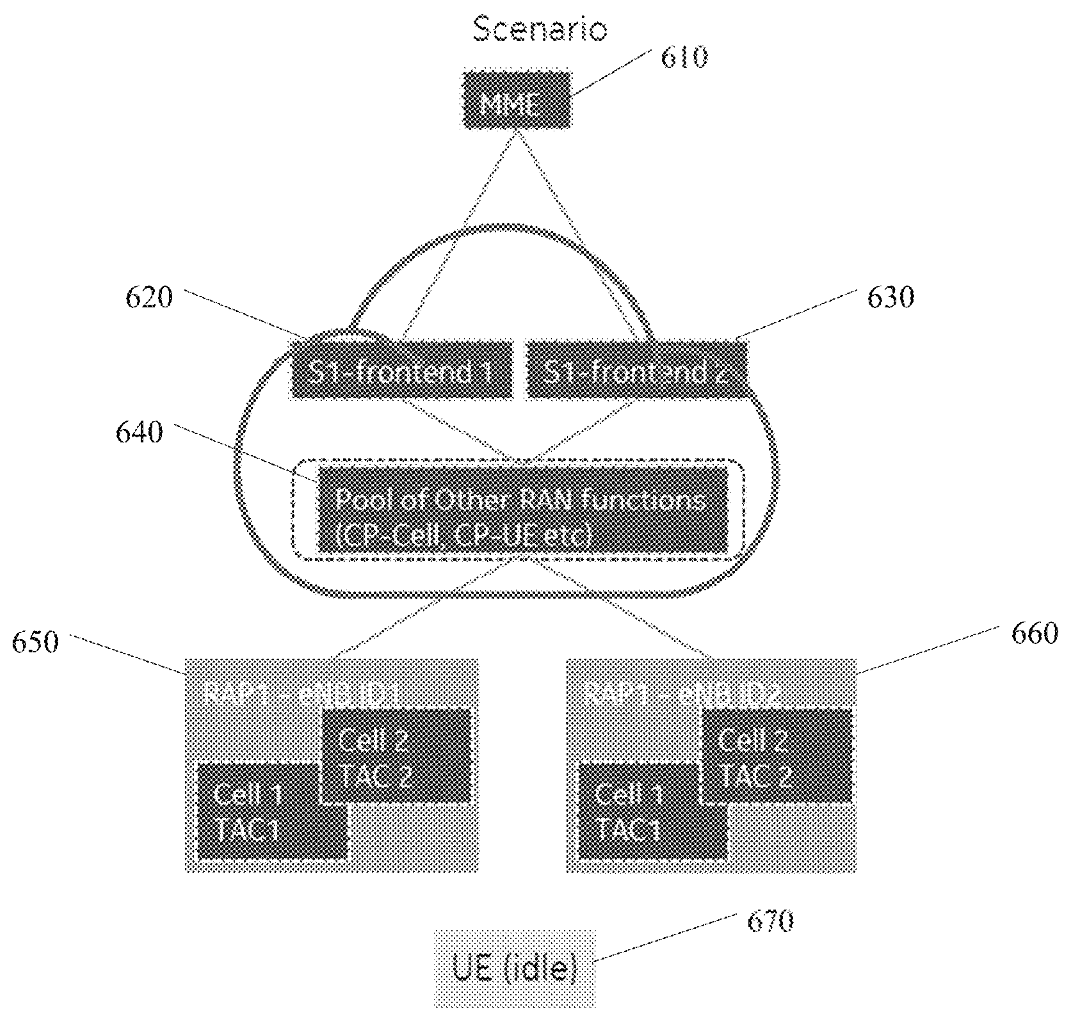
FIG. 6 illustrates a system according to certain embodiments.

FIG. 6 illustrates a system according to certain embodiment. In particular, FIG. 6 illustrates MME 610, front ends 620, 630, and a pool of other RAN functions 640. Front ends 620, 630, and the pool of other RAN functions 640 may be included in a cloud RAN. The system also includes a first RAP 650 having an eNB1 identifier, and a second RAP 660 having an eNB2 identifier. Each RAP includes identifiers for two cells and two TACs. Idle UE 670 may also be provided.

Figure 7:
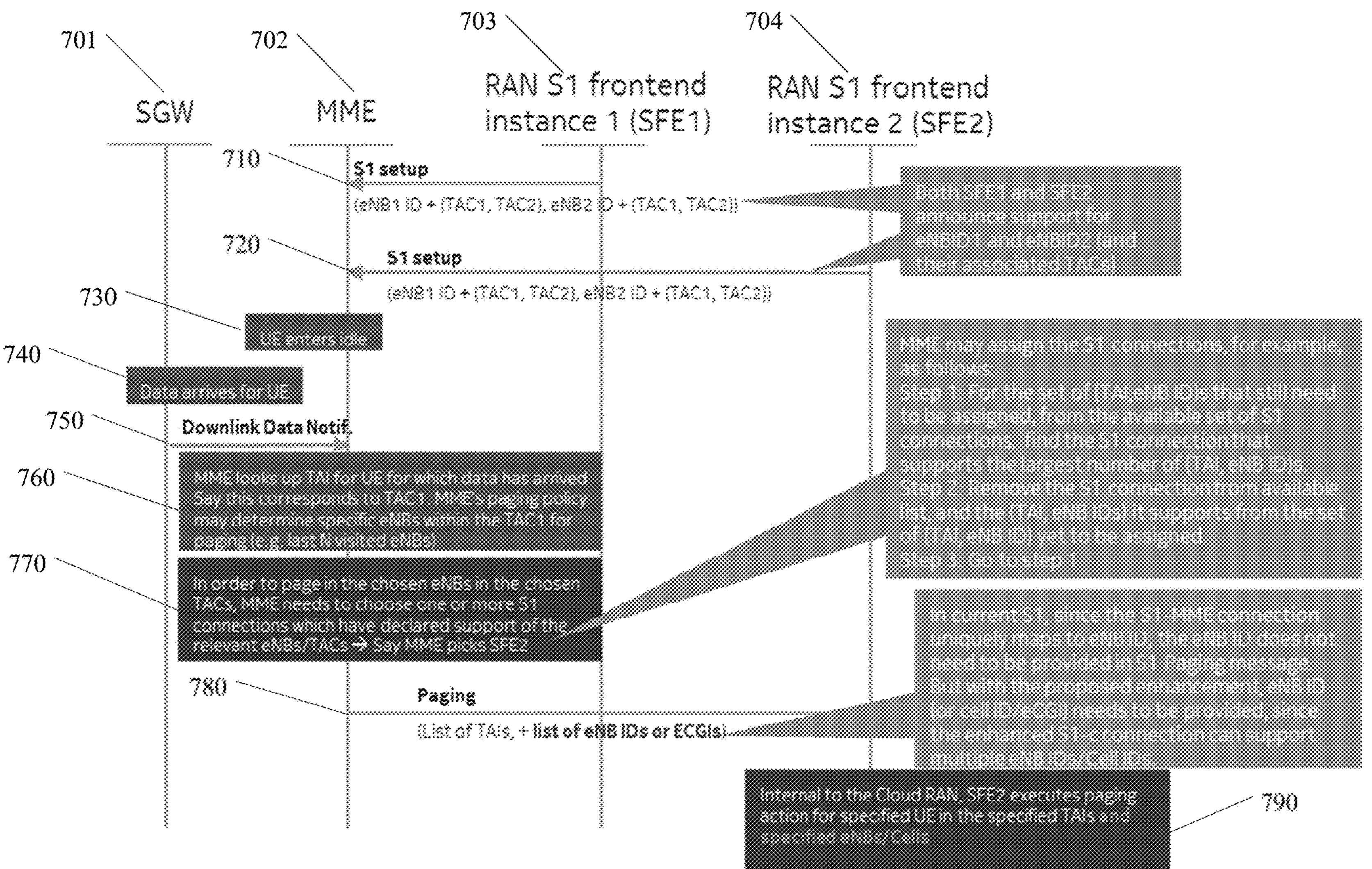
FIG. 7 illustrates a signal flow diagram according to certain embodiments.

FIG. 7 illustrates a signal flow diagram according to certain embodiments. In particular, FIG. 7 illustrates an example in which MME 701 may send a page message, also know as paging, to a UE using one or more tracking area identifiers (TAIs), which includes a public land mobile network identification (PLMN ID) and a TAC. The flow signal diagram shown in FIG. 7 may be carried out by the system shown in FIG. 6. In steps 720 and 730, RAN SFE1 703 and RAN SFE2 704 send an S1 setup message to MME 702. The S1 setup messages may include an identifier of eNB1 and eNB2. In other words, both SFE1 703 and SFE2 704 announce or declare their support for eNB1 and eNB2, as well as their associated TACs. The MME may then send a page message to only one of S1 connection for any given cell. The UE may then enter an idle mode, in step 730. In step 740, the data may arrive for the UE.

In step 750, a downlink data notification may be sent from serving gateway 701 (S-GW) to MME 702. The MME may then look up TAI for the UE, as shown in step 760, for which data has arrived. For example, if the information corresponds to TAC1, the MME paging policy may determine specific eNBs within the TAC1 for paging. For example, the paging policy may dictate paging of the last visited eNB. In order to page the chosen eNB, in step 770, MME 702 may choose one or more of the multiple S1 connections which have declared support of the relevant eNB or TAC. MME 702 may choose SFE2 704.

In certain embodiments, for the set of TAI or eNB IDs that are still not assigned, from the available set of S1 connections, the MME may need to assign the S1 connections. MME 702 may first find and select the S1 connection that supports the largest number of TAI, eNB IDs. Second, the selected S1 connection may be removed from the available list, and the eNB which the selected S1 connection supports may also be removed from the set of eNBs that have yet to be assigned. MME 702 may then repeat the first step until the remaining connections are assigned.

In step 780, MME 702 may initiate the paging of the UE via the RAN SFE2 704. In certain embodiments, as part of the paging sent to RAN SFE2 704, MME 702 may include eNB ID or cell ID, since the S1 connection can support multiple eNB IDs or cell IDs. In other words, the IDs may be provided as part of the paging so that the destination of the paging is known. Once the paging is received in step 790, RAN SFE2 704 may execute paging for a specified UE in the specified TIAs, as well as the specified eNBs and cells. The front ends may utilize other RAN control functions when needed.

In yet another example, TAC1 may include all cells of eNB1 and eNB2. Two front end instances, SFE1 and SFE2, may be used in a load-balancing fashion, and each may establish an S1 connection to the MME. Each of the front ends may then announce their support for TAC1, and provide either eNB IDs or cell IDs of both eNB1 and eNB2. When the MME needs to page a UE in TAC1, the MME may choose to send a page message to only one of SFE1 or SFE2, rather than sending the page message through both.

In certain embodiments, the message sent from the MME may be a UE context release message. The UE context release message may signal to the source eNB that control plane resources of the UE can be released. Upon reception of the context release message, the source eNB may release the control plane resource. The sending of the UE context release message may be initiated by the MME. Because the MME may have multiple S1 connections to multiple S1 front ends, the MME may choose one of multiple possible S1 connections. Picking the S1 connection may depend on the cause of the UE context release. For example, a cause may be a handover.

Figure 8:
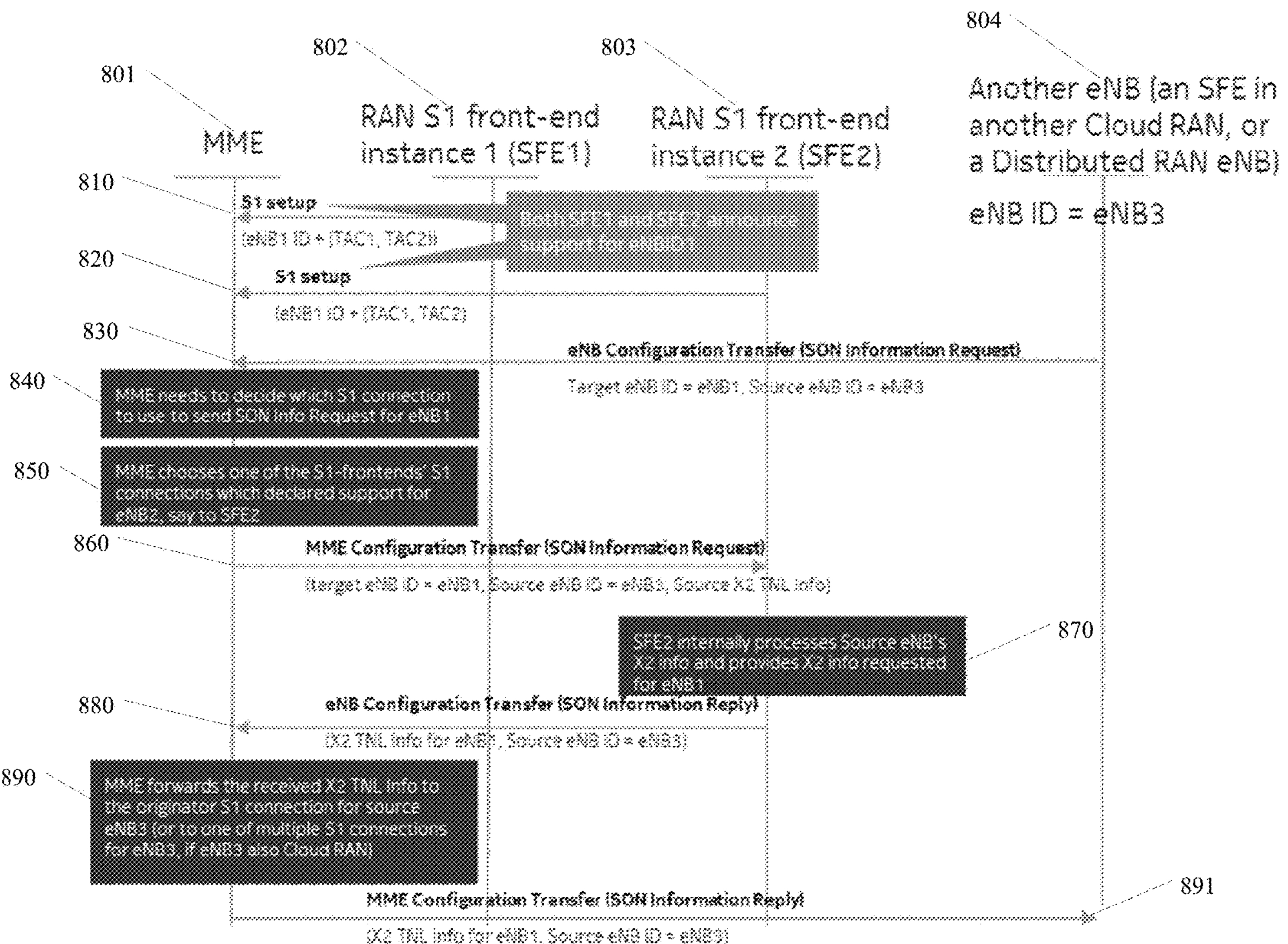
FIG. 8 illustrates a signal flow diagram according to certain embodiments.

FIG. 8 illustrates a signal flow diagram according to certain embodiments. In particular, FIG. 8 illustrates an SON configuration transfer for providing information on neighbor cells that may be used for X2 connection setup to help facilitate automated neighbor relations. When the MME gets a SON configuration transfer ID, also known as an eNB configuration transfer message, as part of the SON information request concerning a given target eNB ID. The MME may pick any one of the S1 connections from the plurality of multiple S1 front ends, which have announced support for the given target eNB ID. The MME may send the configuration transfer message with the SON information request to the target eNB ID via the S1 connection. The front end can then send back a SON information reply message, as part of the eNB configuration transfer, with the X2 information about the target eNB ID.

In steps 810 and 820, an S1 setup messages are received by MME 801 from RAN SFE1 802 and RAN SFE2 803. MME 801 may then receive an SON information request, also known as eNB configuration transfer, from another eNB 804 with an eNB having an ID of eNB3, as shown in step 830. The another eNB, in certain embodiments, may be an SFE in another cloud RAN, or a distributed RAN eNB. In step 840, MME 801 may decide which of the multiple S1 connections the MME may use to send the SON information request for eNB1. MME 801 may then choose one of the connections to the front ends which declared support for eNB2, such as SFE2, as shown in step 850.

In step 860, MME 801 may send the MME configuration transfer or SON information request to SFE2 801. The MME configuration transfer message may include a target eNB ID, a source eNB ID, and source X2 information. SFE2 803 may then internally process a source eNB X2 information, and provide the X2 information requested for eNB1. An SON information reply, also known as an eNB configuration transfer, may then be sent from RAN SFE2 803 to MME 801, as shown in step 880. The SON information reply may include X2 information for eNB1, or a source eNB ID, such as eNB3. In step 890, the MME forwards the received X2 information to the originator S1 connection for source eNB3, or to one of multiple S1 connections for eNB3, when eNB3 is a cloud RAN. MME 801 may then send, in step 891, an MME configuration transfer or an SON information reply message to the another eNB 804.

In certain embodiments, if the source eNB is also in a cloud RAN, then multiple S1 front end instance may be capable of initiating the SON information request from a given source eNB. Therefore, for different SON information requests originating in the same source cell or network node, the MME may actually receive the eNB configuration transfer message from different S1 front ends.

When the MME gets a particular S1 message from an S1 connection initiating a procedure, such as a non-access stratum (NAS) attach or an HO preparation, the MME may respond back on the same S1 connections from which the particular message was received. In other words, in choosing one of the multiple connections, the network entity, such as MME, may choose based on a request having been received from the one of the multiple connections. For example, two UEs may be in the same cell. An attach request message may be sent from both UEs, and received at the MME over different S1 connections. The request from the first UE may get processed in the RAN by a first RAN front end instance, while the request from the second UE may get processed in the RAN by a second RAN front end instance. The MME may then respond to the request on the same connection from where the original request was received.

In addition, in certain embodiments, the MME may choose a connection based on load balancing. Load balancing may dictate that the first procedure of the first UE, such as NAS attach, may be conducted through the S1 connection of a first front end instance, while a subsequent procedure, such as HO or UE context release, may be conducted through a second front end instance due to load balancing considerations.

In some embodiments, the RAN may ensure that a given procedure for UE may be conducted through the same RAN S1 front end instance. Depending on the way that RAN shares data, multiple RAN front ends may share data. When multiple RAN front ends share data, a subsequent part of a procedure may occur on the RAN side via a different front end than was used for the first part of the procedure.

In certain embodiments, the RAN front end may announce or include the type of shared data in the S1 setup message. The MME may then issue a unique identifier or cookie for procedures, so as to be able to correlate the messages regardless of which SFE handles them on the RAN side. In an alternative, the MME may try to ensure that if a first procedure for the UE was conducted through a first front end instance, the subsequent procedures for the same UE may also be conducted though the same first front end instance. For example, if the NAS attach was via the first front end instance, a subsequent setup or modification may also occur through the first front end instance. However, when the RAN employs shared data based pooling, the MME itself may choose to load balance procedures across connection with the knowledge that the RAN can correlate procedures across SFE instances.

Figure 9:
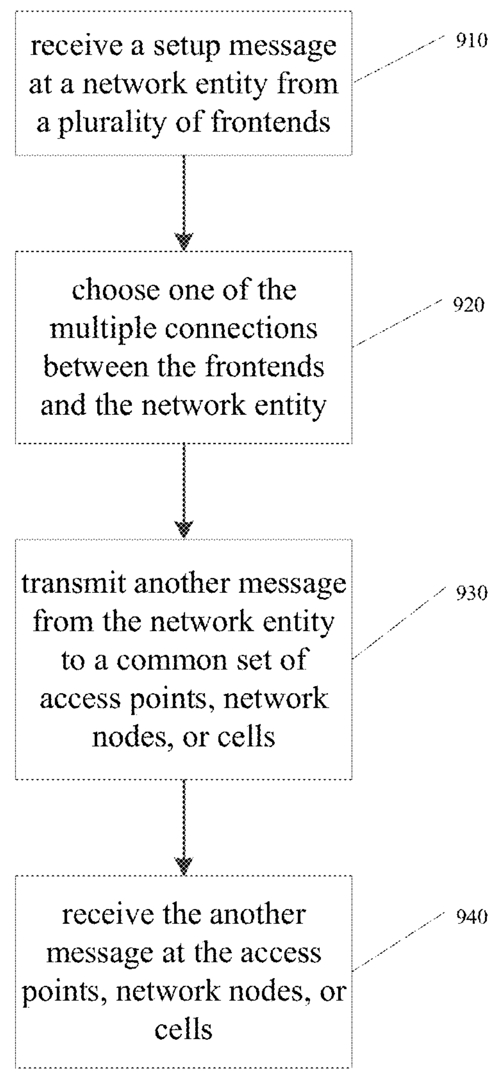
FIG. 9 illustrates a method flow diagram according to certain embodiments.

FIG. 9 illustrates a flow diagram according to certain embodiments. In step 910, the network entity, such as an MME, may receive at least one setup message from a plurality of front ends. Multiple connections are established between the network entity and the plurality of front ends. In addition, the network entity may receive a list of identifiers from the front ends. The list of identifiers may include a list of at least one of network node identifiers or cell identifiers, and the list of identifiers may be used by the network entity in the choosing of the one of the multiple connections. The plurality of front ends may be located in a cloud radio access network, and the multiple connections may be S1 connections.

In step 920, the network node chooses at least one of the multiple connections to transmit another message to one of the plurality of front ends which map back to a common set of at least one radio access points, network nodes, or cells. The choosing of one the multiple connections involves using a round-robin or a load balancing approach. In certain embodiments, the another message may simply be referred to as a message. In step 930, the network node transmits the another message from the network entity through the chosen one of the multiple connections to the common set of at least one radio access points, network nodes, or cells. The another message may include a handover request, a paging, a context release message, a self-organizing network configuration transfer, or a network node configuration update. In step 940, the another message may be received at the access point, the network node, or the cell.

Figure 10:
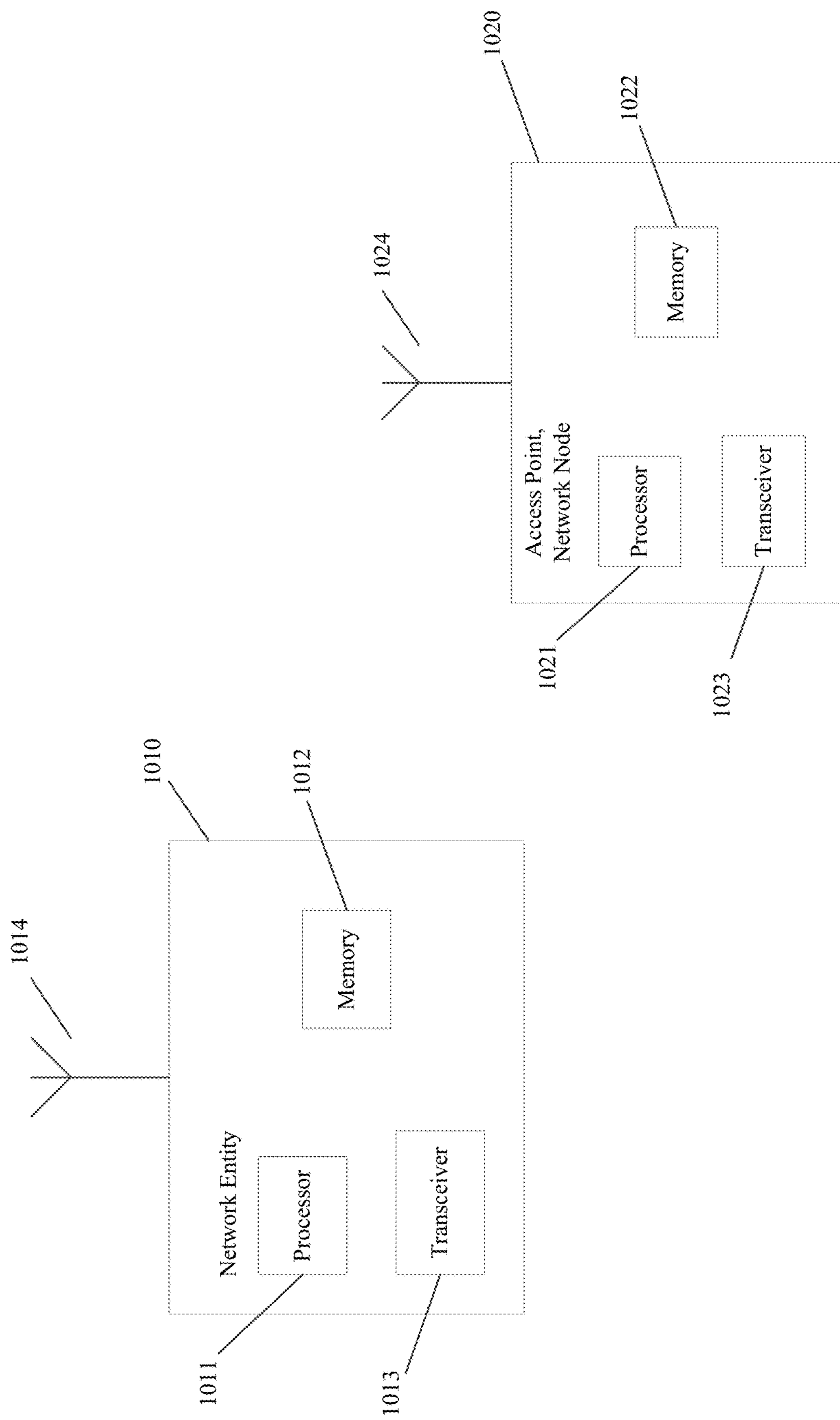
FIG. 10 illustrates a system according to certain embodiments.

FIG. 10 illustrates a system according to certain embodiments. It should be understood that each signal or block in FIGS. 1-9 may be implemented by various means or their combinations, such as hardware, software, firmware, one or more processors and/or circuitry. In one embodiment, a system may include several devices, such as, for example, network entity 1010 or network node or access point 1020. The system may include a user equipment and a cloud RAN, which may include at least one front end and other RAN functions. The system may include more than one network node or access point 1020 and more than one network entity

1010, although only one access node shown for the purposes of illustration. The network entity 1010 may be a MME or an MME equivalent in 5G. The network node or access point 1020 may be a base station, an access node, a 5G NB or 5G BTS, a server, a host, or any of the other access or network node discussed herein.

Each of these devices may include at least one processor or control unit or module, respectively indicated as 1011 and 1021. At least one memory may be provided in each device, and indicated as 1012 and 1022, respectively. The memory may include computer program instructions or computer code contained therein. One or more transceiver 1013 and 1023 may be provided, and each device may also include an antenna, respectively illustrated as 1014 and 1024. Although only one antenna each is shown, many antennas and multiple antenna elements may be provided to each of the devices. Other configurations of these devices, for example, may be provided. For example, network entity 1010 and network node or access point 1020 may be additionally configured for wired communication, in addition to wireless communication, and in such a case antennas 1014 and 1024 may illustrate any form of communication hardware, without being limited to merely an antenna.

Transceivers 1013 and 1023 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

As discussed above, the network node and/or access point 1020 may communicate with a user equipment or a user device. The user equipment may include at least a processor, memory, transceiver, or any hardware and/or software described herein. The user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a network entity or a network node, may include means for carrying out embodiments described above in relation to FIGS. 1-9. In certain embodiments, at least one memory including computer program code can be configured to, with the at least one processor, cause the apparatus at least to perform any of the processes described herein.

Processors 1011 and 1021 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 1012 and 1022 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 1010 or network node or access point 1020, to perform any of the processes described above (see, for example, FIGS. 1-9). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 10 illustrates a system including a network entity 1010 and access point or network node 1020, certain embodiments may be applicable to other configurations, and configurations involving additional elements, as illustrated and discussed herein. For example, multiple access points and multiple network entities may be present, or other nodes providing similar functionality, such as nodes that combine the functionality of a user equipment and a network entity, such as a relay node. The access point or network node may likewise be provided with a variety of configurations for communication other than communication network entity 1010. The cloud RAN, and the front ends and other RAN functions provided within the cloud RAN, may be operated on a server or a host that may include a processor, memory, transceiver, or any hardware and/or software described herein.

The above embodiments provide for significant improvements to the functioning of a network and/or to the functioning of the network entities, access points, or network nodes within the network, as well as UEs communicating with the network. Certain embodiments provide for multiple connections, such as S1 connections, between a network entity, such as an MME, to a plurality of front ends. The front ends may map back to a common set of radio access points, network nodes, or cells. The flexibility created by the use of multiple S1 connections and the plurality of front ends may improve the scalability, load-balancing, and pooling of the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The above embodiments may be applied in LTE, LTE-A, 5G technology, or any other mobile network or wireless system.

Partial Glossary

3GPP third generation partnership project
LTE long term evolution
LTE-A LTE Advanced
eNB evolved NodeB
TACs tracking area codes
UE user equipment
ECGI EUTRAN Cell Global Identity
RAN radio access network
VNF virtual network function
RAP radio access point
CP control plane
SFE RAN S1 front end instance
TAI tracking area identifier

I claim:

1. A method, comprising:

receiving at least one setup message at a core network entity from a plurality of front ends, wherein multiple connections are established between the core network entity and the plurality of front ends, wherein the plurality of front ends are located in a cloud radio access network and can process messages for a common set of at least one radio access points, network nodes, or cells, and wherein the setup message from each of the plurality of front ends contains at least one list of identifiers of radio access points, network nodes, or cell identifiers from the common set of at least one radio access points, network nodes, or cells for which messages can be processed by that front end, wherein the at least one list of identifiers of radio access points, network nodes, or cell identifiers received from a first front end of the plurality of front ends has at least one identifier in common with the at least one list of identifiers received from a second front end of the plurality of front ends;

choosing, by the core network entity, at least one of the multiple connections to transmit another message to one of the plurality of front ends, wherein the another message is a user equipment-associated message associated with a user equipment that is connected to or intending to connect to only one of the radio access points, network nodes, or cells, and wherein the identifier of the only one of the radio access points, network nodes, or cells that the user equipment is connected to or intending to connect to is included in the list of identifiers received from the front end where the front end's connection is chosen by the core network entity to transmit the another message; and transmitting the another message from the core network entity through the chosen one of the multiple connections so as to cause the another message to be delivered to the user equipment via the only one of the radio access points, network nodes, or cells to which the user equipment is connected or intending to connect.

2. The method according to claim 1, wherein the multiple connections are S1 connections.

3. The method according to claim 1, wherein the list of identifiers is listed using wild card characters.

4. The method according to claim 1, wherein the another message may be processed by at least one cloud radio access network control function before being transmitted to the common set of the at least one radio access points, network nodes, or cells.

5. The method according to claim 1, wherein the another message comprises a handover request, a paging, a context release message, a self-organizing network configuration transfer, a network node configuration update.

6. The method according to claim 1, wherein the core network entity is a mobility management entity.

7. The method according to claim 1, wherein the front ends declare support for the another message for at least one of all S1 procedures, user equipment associated procedures, or non-user equipment associated procedures.

8. The method according to claim 1, wherein the multiple connections connect the core network entity to the plurality of front ends located at multiple cloud radio access networks.

9. The method according to claim 1, wherein the choosing of one the multiple connections includes using a round-robin or a load balancing approach.

10. The method according to claim 1, wherein the choosing of one of the multiple connections is based on a request having been received from the one of the multiple connections.

11. A method, comprising:

receiving a message in at least one radio access points, network nodes, or cells through at least one of multiple connections from a core network entity, wherein the at least one radio access points, network nodes, or cells are part of a common set that are mapped back from a plurality of front ends, and wherein the multiple connections are established between the core network entity and the plurality of front ends, wherein the plurality of front ends are located in a cloud radio access network, wherein the plurality of front ends receives at least one list of identifiers, wherein the list of identifiers is used by the network entity in the choosing of the one of the multiple connections, wherein the list of identifiers comprises a list of at least one of network node identifications or cell identifications, wherein the at least one list of identifiers received from a first front end of the plurality of front ends has at least one identifier in common with the at least one list of identifiers received from a second front end of the plurality of front ends, wherein the message is a user equipment associated message associated with a user equipment that is connected to or intending to connect to only one of the radio access points, network nodes, or cells, wherein an identifier of the only one of the radio access points, network nodes, or cells that the user equipment is connected to or intending to connect is included in the list of identifiers received from the front end where the front end's connection is chosen by the core network entity to transmit the message, wherein the message is to be delivered to the user equipment via the only one of the radio access points, network nodes, or cells to which the user equipment is connected or intending to connect.

12. The method according to claim 11, wherein the multiple connections are S1 connections.

13. The method according to claim 11, wherein the message comprises a handover request, a paging, a context release message, or a self-organizing network configuration transfer.

14. An apparatus, comprising:

at least one memory comprising computer program code;

at least one processor;

wherein the at least one memory and the computer program code are configured, with the at least one processor, to cause the apparatus at least to:

receive at least one setup message at a core network entity from a plurality of front ends, wherein multiple connections are established between the core network entity and the plurality of front ends, wherein the plurality of front ends are located in a cloud radio access network and can process messages for a common set of at least one radio access points, network nodes, or cells, and, wherein the setup message from each of the plurality of front ends contains at least one list of identifiers of radio access points, network nodes, or cell identifiers from the common set of at least one radio access points, network nodes, or cells for which messages can be processed by that front end, wherein the at least one list of identifiers of radio access points, network nodes, or cell identifiers received from a first front end of the plurality of front ends has at least one identifier in common with the at least one list of identifiers received from a second front end of the plurality of front ends;

choose, by the core network entity, at least one of the multiple connections to transmit another message to one of the plurality of front ends, wherein the another message is a user equipment-associated message associated with a user equipment that is connected to or intending to connect to only one of the radio access points, network nodes, or cells, and wherein the identifier of the only one of the radio access points, network nodes, or cells that the user equipment is connected to or intending to connect to is included in the list of identifiers received from the front end where the front end's connection is chosen by the core network entity to transmit the another message; and transmit the another message from the core network entity through the chosen one of the multiple connections so as to cause the another message to be delivered to the user equipment via the only one of the radio access points, network nodes, or cells to which the user equipment is connected or intending to connect.

* * * * *